United States Patent [19]

Mott

[11] 3,724,064
[45] Apr. 3, 1973

[54] SEALING METHOD

[76] Inventor: Lambert H. Mott, c/o Mott Metallurgical Corp., P.O. Drawer "L" Farmington Industrial Park, Farmington, Conn. 06032

[22] Filed: May 3, 1972

[21] Appl. No.: 249,967

Related U.S. Application Data

[63] Continuation-in-part of Ser. No. 215,458, Jan. 5, 1972, abandoned, which is a continuation-in-part of Ser. No. 51,884, July 2, 1970, abandoned.

[52] U.S. Cl..................................29/520, 425/464
[51] Int. Cl..........................B21d 39/00, B23p 11/00
[58] Field of Search..............210/478, 479, 335, 489; 277/236, 205, 206; 425/464; 29/522, 526, 520; 76/107 S

[56] References Cited

UNITED STATES PATENTS

| 3,295,161 | 1/1967 | Mott | 18/8 SF |
|---|---|---|---|
| 3,208,758 | 9/1965 | Carlson et al | 277/236 X |
| 3,080,171 | 3/1963 | Booth | 277/236 X |
| 3,432,177 | 3/1969 | Colwell | 277/205 |
| 3,345,078 | 10/1967 | Biallcowski | 277/236 X |
| 3,045,830 | 7/1962 | Fulton | 210/478 X |
| 3,147,015 | 9/1964 | Hanback | 277/205 |
| 2,860,540 | 11/1958 | Karlsson | 29/522 X |
| 2,630,964 | 3/1953 | Scheldorf | 29/522 X |
| 2,078,212 | 4/1937 | Leighton | 29/520 X |

*Primary Examiner*—Samih N. Zaharna
*Assistant Examiner*—F. F. Calvetti
*Attorney*—Peter L. Tailer

[57] ABSTRACT

A filter element for the high pressure filtration of synthetic polymers is locked and sealed in a filter body by providing a peripheral shoulder in the filter element and a soft metal rim seated in the peripheral shoulder, the rim having a longitudinal corrugation which is flattened to radially expand the rim inward and outward to lock and seal the filter element in the filter body. A hard metal locking rim may be used to provide a seal if a means is provided to maintain a pressure on the rim to flatten its corrugation and expand it inward and outward. Other elements may be sealed by the method of this invention.

9 Claims, 16 Drawing Figures

SEALING METHOD

CROSS REFERENCE TO RELATED APPLICATIONS

This application is a continuation-in-part of my patent application Ser. No. 215,458 filed Jan. 5, 1972, entitled FILTER ELEMENT LOCK which, in turn, was a continuation in-part of my patent application Ser. No. 051,884 filed July 2, 1970 both of which are now abandoned.

BACKGROUND OF THE INVENTION

A main problem encountered in the use of porous metal disks and other filter elements as filters for synthetic polymers is the provision of a good seal and lock between the edges of the filter disks and filter pack walls. Any seals upstream of a filter disk provide a "dead" area where the polymer tends to overheat and degrade. This upstream degraded polymer catalyzes further degredation and considerably shortens the life of an entire filter pack system. It is also desirable to assemble and lock a stack of filter disks in a filter body with each disk being individually sealed and locked in place. However, this sealing and locking must be done in such a manner that the disks may be easily and cheaply removed and replaced for cleaning. This invention provides a superior filter disk lock and seal in this specific environment and it provides a method to lock and seal and other types of elements.

DESCRIPTION OF THE PREFERRED EMBODIMENTS

Figure 6:
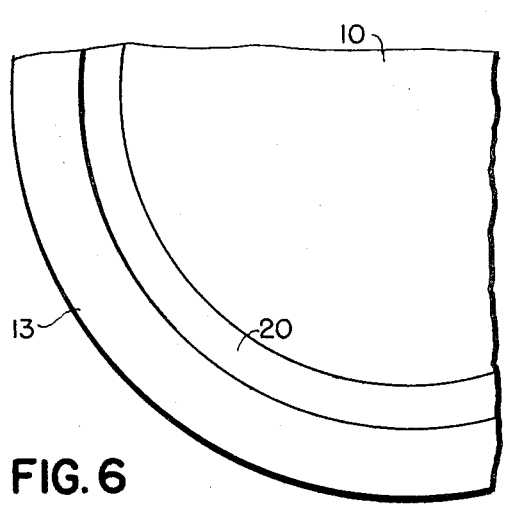
FIG. 6 is a rear end view of the inner end of the filter pack of FIG. 1, portions being broken away.
Figure 1:
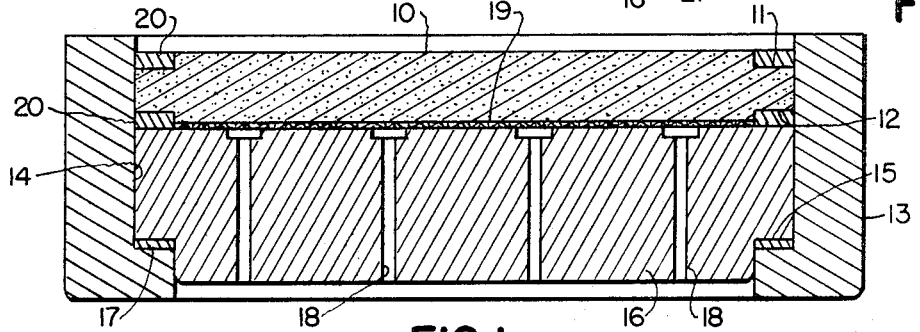
FIG. 1 is a longitudinal section through a single disk filter pack assembled according to this invention.

As shown in FIGS. 1 and 6, a filter disk 10 of porous stainless steel or the like is formed with upper and lower annular shoulders 11 and 12. A filter body 13 has a cylindrical cavity 14 with a lower annular inner shoulder 15. A spinnerette disk 16 seats against shoulder 15 with a flat soft metal washer 17 therebetween. Disk 16 contains the extrusion orifices 18. Disposed over the orifices 18 is a diffuser screen 19 to hold disk 10 away from the upstream face of spinnerette disk 16 so that the upstream face of disk 16 does not blind most of the downstream face of disk 10. With diffuser screen 19 positioned as shown, flow passes through filter disk 10 and then spreads laterally through the wires of screen 19 to escape through the extrusion orifices 18.

Figure 2:
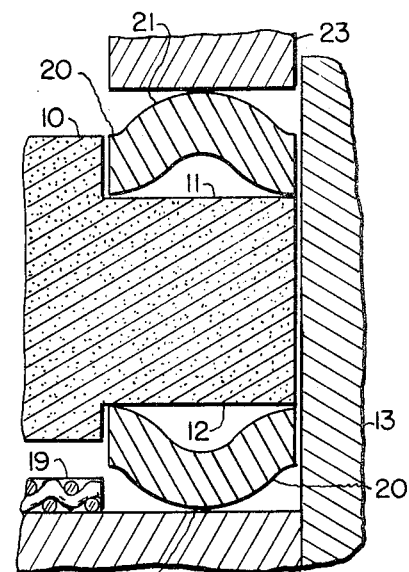
FIG. 2 is an enlarged detail in longitudinal section of the edge of the filter disk of FIG. 1 prior to its being locked in the filter body.

As shown in FIG. 2, the diameter of disk 10 allows it to fit into filter body 13. Two locking rings 20 are disposed about the shoulders 11 and 12, each locking ring 20 having a single annular corrugation 21 projecting away from disk 10. The rings 20 fit freely between the shoulders 11 and 12 and the wall of cavity 14. Shoulder 11 is the same depth as the thickness of a ring 20. Shoulder 12 is shallower by the thickness of screen 19 so that shoulder 12 plus screen 19 equals the thickness of a ring 20.

Figure 3:
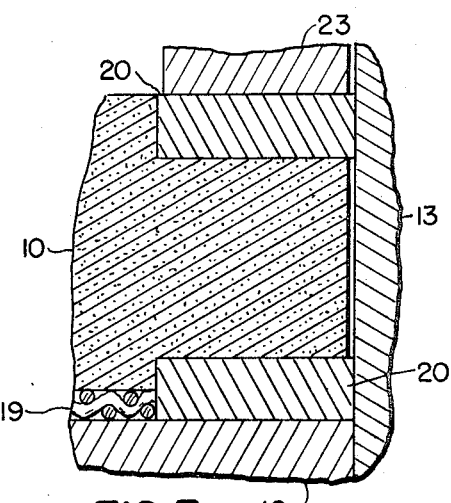
FIG. 3 is an enlarged detail in longitudinal section of the edge of the filter disk of FIG. 1 after it is locked in the filter body.

To seat disk 10, an annular press 23 is placed over the uppermost ring 20 and disk 10 is seated as shown in FIG. 3 by forcing it downward and flattening the corrugations 21. The flattening of the corrugations 21 radially expands the rings 21 both inwardly and outwardly to lock and seal disk 10 in filter body 13. When disk 10 is to be removed for cleaning, it may be pressed from filter body 13 and replaced with new rings 20.

Figure 4:
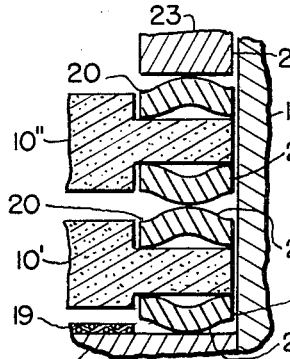
FIGS. 4 and 5 are longitudinal sections through broken away portions of the edges of multiple filter disks in a filter body shown, respectively, before and after being locked in the filter body.
Figure 5:
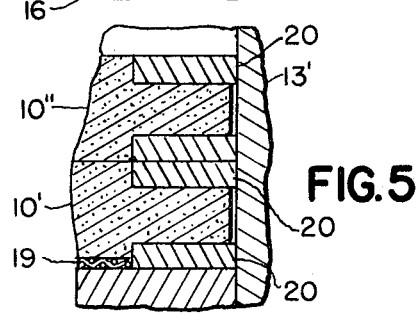

As shown in FIGS. 4 and 5, a plurality of filter disks 10' and 10'' may be locked in a deeper filter body 13' over a spinnerette disk 16 by means of the locking rings 20 which are all simultaneously expanded by annular press 23.

The rings 20 provide a tight seal at the high extrusion pressures required. In one example of this invention, rings 20 of 1100 Series aluminum provided excellent sealing and locking results at upstream filter pressures of 4,000 psi. The rings 20 were from 1/16 inch aluminum about 3 inches in diameter and 0.180 inch wide with a corrugation raised about 0.025 inch. The screen 19 was 0.032 inch thick. The annular or sleeve press 23 applied a force of up to 12,000 pounds to lock disk 10 in place by expanding the rings 20 to radially engage the disk 10 and the filter body 13.

Figure 7:
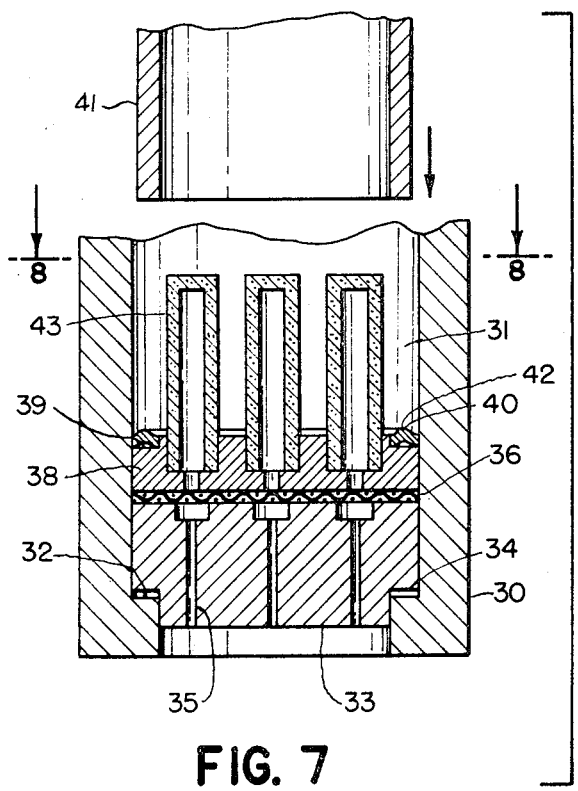
FIG. 7 is a longitudinal section through a broken away lower portion of an extended area filter pack assembled according to this invention.
Figure 8:
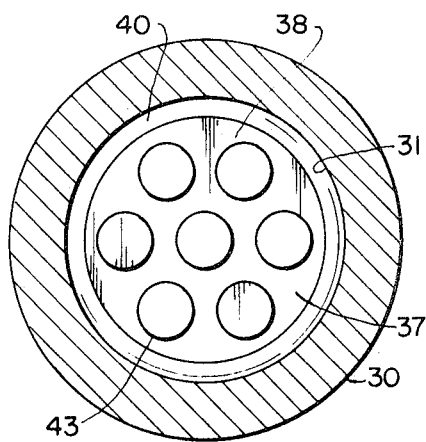
FIG. 8 is a section taken on line 8-8 of FIG. 7.

Referring now to FIGS. 7 and 8, a filter body 30 has a central cavity 31 with a lower annular shoulder 32. A spinnerette disk 33 seats on shoulder 32 over a soft metal gasket 34. Disk 33 contains extrusion apertures 35 and has disposed over it a diffuser screen 36. An extended area filter 37 has a disk 38 which need not be of porous metal as it does not perform the main filtering function. An array of porous filter tubes 43 mounted in disk 38 provide a large filter area. Disk 38 contains an annular shoulder 39 to accommodate a locking ring 40. An annular press 41 flattens an annular corrugation 42 in ring 40 to expand it inward and outward radially locking disk 38 in body 30.

Figure 9:
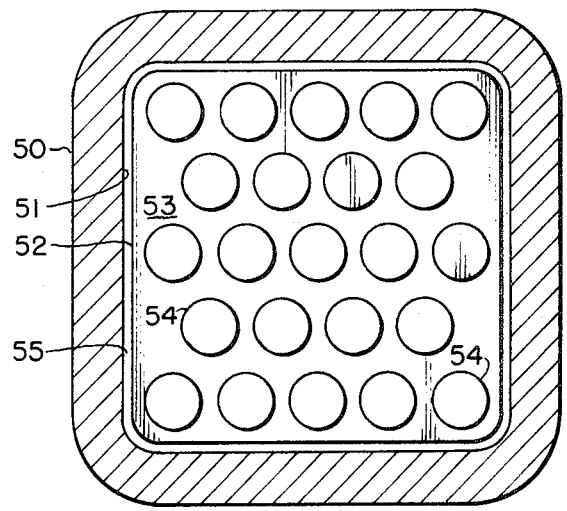

FIG. 9 shows a substantially square filter body 50 containing a cavity 51 within which is disposed an extended area filter 52 having a plate 53 mounting the tubular filter elements 54 of porous material. A peripheral shoulder is formed about the upper edge of plate 53 to receive the soft metal locking rim 55 therein. Rim 55 is similar to ring 20 except that it is substantially square with rounded corners. Rim 55 has a longitudinal corrugation which extends upward to be flattened to lock filter 52 in place.

Figure 10:
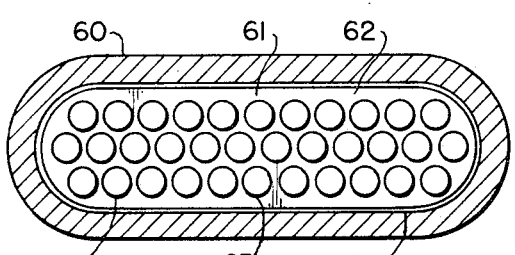
FIGS. 9, 10 and 11 are transverse sections taken through extended area filter packs of different configurations assembled according to this invention.

FIG. 10 shows an oblong filter body 60 containing an oblong extended area filter 61 having a plate 62 and porous filter tubes 63. Filter 61 is secured in place by flattening a longitudinal corrugation of locking rim 64, rim 64 resting in a peripheral shoulder of plate 62.

Figure 11:
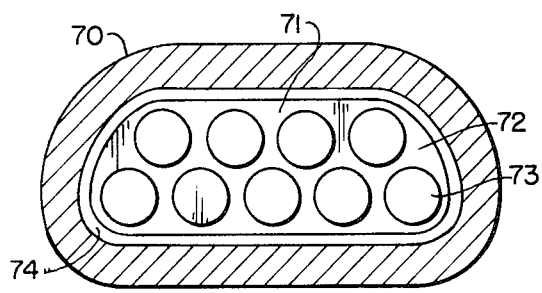

FIG. 11 shows a kidney shaped filter body 70 containing a conforming extended area filter 71 having a plate 72 and filter tubes 73 secured in place by a locking rim 74.

Figure 12:
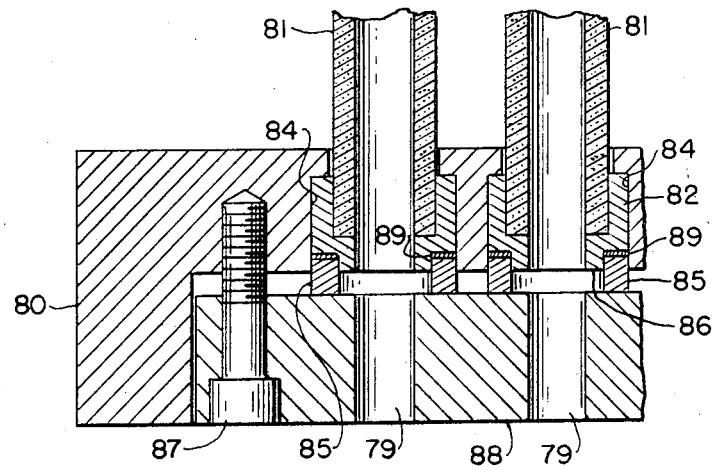
FIG. 12 is a transverse axial section through a fragment of a base plate of a first multi-tube filter showing filter tubes sealed therein.
Figure 13:
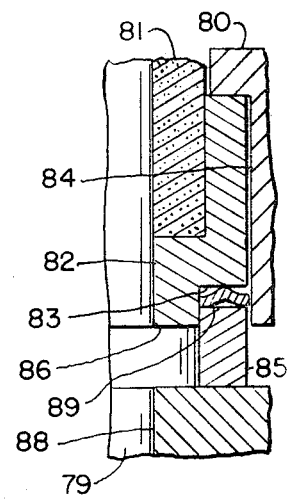
FIG. 13 is an enlarged detail of fragments of the base plate and a filter tube of FIG. 12 before sealing the filter tube in the base plate.

As shown in FIGS. 12 and 13, a base plate 80 has porous metal filter tubes 81 fixed and sealed to extend upward from it. The bases of the tubes 81 are soldered or otherwise fixed in the metal shanks 82 each of which have a downward facing annular shoulder 83. The shanks 82 fit upward to seat in the passages 84 bored in base plate 80. Metal pressure rings 85 extend upward about the ends 86 of shanks 82 and into the passages 84 bored in base plate 80. The tightening of bolts 87 draws a compression plate 88 upward to force the pressure rings 85 into passages 84 toward the shoulders 83. A locking ring 89 having an annular corrugation is disposed below each shoulder 83 to be compressed axially by a pressure ring 85 to flatten the annular corrugation of each locking ring 89. This radially expands the locking rings 89 inward and outward to make a tight seal between the tubes 81 and base plate 80. Compression plate 88 contains apertures 79 for the flow of a polymer therethrough to enter the tubes 81.

The locking rings 89 may be of soft metal or of thin harder sheet metal stock. In one example, the locking rings 89 were of 0.010 inch stainless steel which dug into the passages 84 and the shanks 82 to form a seal as long as the rings 89 were held under compression by the pressure rings 85. Release of the pressure by unscrewing bolts 87 allows the easy removal of tubes 81 for servicing.

Figure 14:
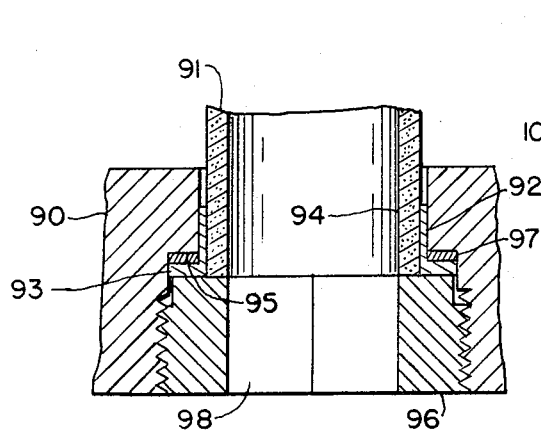
FIG. 14 is a transverse axial section through a fragment of a base plate of a second multitube filter showing a filter tube sealed therein.
Figure 15:
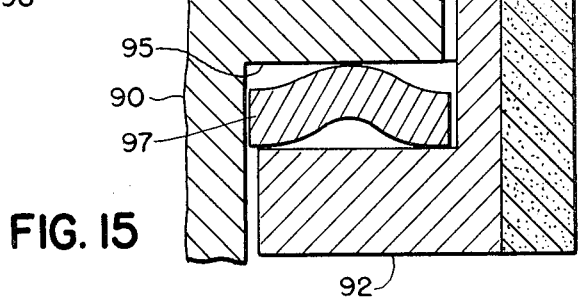
FIG. 15 is an enlarged detail of fragments of the base plate and the filter tube of FIG. 14 before sealing the filter tube in the base plate.

FIGS. 14 and 15 show another embodiment of this invention in which a base plate 90 has porous stainless steel filter tubes 91 fixed and sealed within it. Each tube 91 has a shank 92 brazed or otherwise fixed to it. Shank 92 has an annular rim 93 which fits within the bore 94 in plate 90. Bore 94 has a downward facing annular shoulder 95 towards which rim 93 is urged as plug 96 is screwed upward in the lower part of bore 94. Plug 96 contains a hexagonal opening 98 which allows for the passage of a polymer to tube 91 and which is used for the tightening of plug 96. A locking ring 97 having an annular corrugation is disposed between rim 93 and shoulder 95 to be compressed and radially expanded inward and outward to seal tube 91 in base plate 90.

Figure 16:
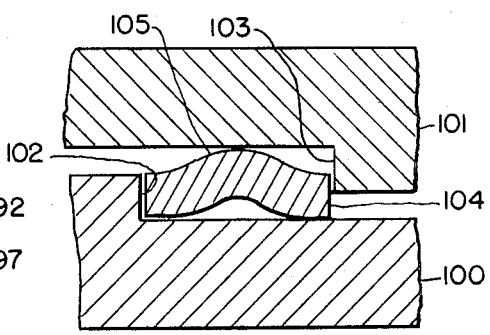
FIG. 16 is a transverse axial section through fragments of two elements before they are forced together to be sealed by a locking rim according to this invention.

As shown in FIG. 16, any two facing plates, pipe flanges, or the like 100 and 101 may have outward and inward facing shoulders 102 and 103 formed on them. A locking rim 104 having a longitudinal corrugation 105 is disposed between the shoulders so that forcing the plates 100 and 101 together compresses the corrugation 105 expanding the rim 104 sideways to form a superior seal.

What is claimed is:

1. The method of forming a seal between two elements, one having a peripheral shoulder and the other having a cavity conforming to the shoulder, comprising the steps of
   a. placing a locking rim having a longitudinal corrugation between the shoulder of one element and the cavity of the other element, the longitudinal corrugation extending away from one of said elements, and
   b. flattening the longitudinal corrugation of the locking rim laterally expanding the locking rim inward and outward to engage the shoulder and the cavity of the elements forming a seal.

2. The method according to claim 1 wherein the locking rim is of soft metal.

3. The method according to claim 1 wherein the longitudinal corrugation is flattened by providing a means to maintain a pressure on the locking rim.

4. The method according to claim 3 wherein the locking rim is of thin sheet metal.

5. The method according to claim 1 wherein the elements have inward and outward facing shoulders, the locking rim being placed between the shoulders and the corrugation being flattened by forcing the elements together.

6. The method according to claim 1 wherein the element having a peripheral shoulder is a filter element, the element containing a cavity is a filter body, and the locking rim is of soft metal.

7. The method according to claim 6 wherein the filter element has a disk portion containing an annular shoulder and the locking rim is a locking ring having an annular corrugation.

8. The method according to claim 1 wherein the element having a peripheral shoulder is a filter tube with a shank fixed thereto, the shank having an annular rim, and the element having a cavity is a base plate containing a bore with an internal shoulder, the locking rim being placed against the shoulder and being flattened by the rim of the shank to expand laterally engaging the shank and the bore.

9. The method according to claim 1 wherein the element having a peripheral shoulder is a filter tube with a shank fixed thereto, the shank having a downward facing annular shoulder about which the locking rim is disposed, and the element having a cavity is a base plate containing a bore within which the shank and the locking rim are disposed, the longitudinal corrugation of the locking rim being flattened by forcing a ring disposed about the shoulder into the bore expanding the locking ring inward and outward engaging the shoulder and the bore.

* * * * *